Figure 1:
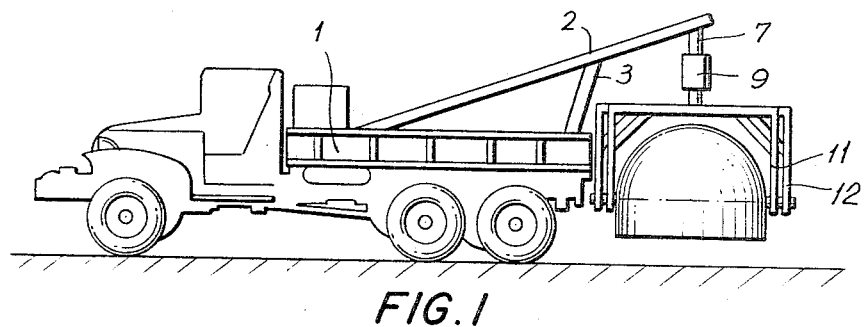

March 28, 1967 J. LOEB ET AL 3,311,349
SYSTEM FOR SECURING A SEISMIC VIBRATOR TO A VEHICLE
Filed Sept. 21, 1965 3 Sheets-Sheet 3

United States Patent Office 3,311,349
Patented Mar. 28, 1967

3,311,349
SYSTEM FOR SECURING A SEISMIC VIBRATOR TO A VEHICLE
Julien Loeb, Saint-Cloud, and Jean-Pierre Rothenbuhler, Sucy-en-Brie, France, assignors to Compagnie Generale de Geophysique and Institut Francais des Petroles, des Carburants et Lubrifiants
Filed Sept. 21, 1965, Ser. No. 488,885
Claims priority, application France, Oct. 2, 1964, 990,098
4 Claims. (Cl. 254—93)

The present invention is directed to vibrators which are used for seismic prospection by the production of seismic waves. The use of such vibrators has become increasingly popular and provides various advantages with reference to the methods resorting to explosive forces for the production of such waves.

A vibrator of a suitable size has a comparatively large weight of the magnitude of several hundred kilograms. Since it is necessary to move it often to regions of desired prospection, it is of advantage to fit it on a truck by means which allows its conveyance in an easy manner and which permits its rapid placement in operative and inoperative positions.

All known arrangements of such a type are satisfactory when the vibrator is to be located on a horizontal ground, but serious drawbacks appear during its positioning on a sloping ground. As a matter of fact, in this latter case, the vibrator has a tendency to slide along the line of major slope, since the frictional forces holding the vibrator in position are considerably reduced, by the vibrations when the vibrator is operative and consequently, the vibrator slides along its line of major slope, which leads to disturbances in operation.

The present invention has for an object to provide a means for securing the vibrator to the chassis of a truck such that the reaction of the connection forces between the truck and the vibrator satisfy simultaneously the two following conditions:

The resultant of the forces should always pass, at least as a matter of first approximation through the center of gravity of the vibrator.

Said resultant should have a constant direction perpendicular to the horizontal or sloping plane of contact between ground and the vibrator.

It is apparent that under such conditions, any tendency towards a lateral sliding of the vibrator is substantially precluded since the resultant of all the stresses exerted on the vibrator has no component in the plane of contact between the vibrator and the ground surface.

The sole forces acting on the vibrator are the forces connecting the vibrator with the chassis of the truck, the actual weight of the vibrator and the reaction of the ground.

The vibrator is in contact with the ground over an area of a circular shape, the line normal to the plane of said circular area passing through the center of gravity of the vibrator whereby the reaction force also passes through said center of gravity since the ground may be considered as homogeneous in the vicinity of the vibrator.

It is thus apparent that it is necessary for the reaction of the connection forces between the vibrator and the truck to also pass through the center of gravity. As a matter of fact, it is only when said condition is satisfied that it is possible to proceed with the vectorial addition of the various forces acting on the vibrator and passing through the center of gravity of the vibrator.

It is true that, when the vibrator is operative, the mass lying inside it executes a relative movement with reference to the casing of the vibrator and consequently, the center of gravity moves slightly with reference to the casing but the phenomenon to be thus considered is of a secondary importance and does not modify substantially the considerations underlying the above discussion.

In order to satisfy the above condition and according to a first main feature of the invention, the connection between the vehicle chassis and the vibrator casing is executed by means of two rods incorporating jacks, said two rods having their upper ends secured to the chassis of the truck, preferably through the agency of ball and socket joints. In order to constrain the forces exerted by said jacks to pass through the center of gravity of the vibrator, the latter is given substantially the shape of a ball having an axial symmetry, and is provided with two bearing surfaces of a cylindrical shape having a common axis which passes through the center of gravity of the vibrator.

Said bearing surfaces revolvably carry the lower corresponding ends of two forked members each of which is associated with a jack so that the forces exerted by the jacks on the vibrator through the agency of said bearing surfaces consequently pass necessarily through the center of gravity of the vibrator.

In order that the resultant of the forces exerted by the jacks on the vibrator passes through the center of gravity thereof, the weight of the vibrator, is always perpendicular to the ground surface. To this end, the vibrator is provided at its lower end and near its supporting plate with gauges of any suitable type which allow measuring the stresses exerted by the ground on the vibrator.

It is readily apparent that if the reaction of the jacks after vectorial addition thereto of the vibrator weight is normal to the ground surface, the two operative gauges measure the same stress and supply indications of equal value. In contradistinction, any dissymmetry leads to different values for such stresses.

According to a further feature of the invention, any difference between the values of said measurements is employed to modify the stresses exerted by each of the jacks, so as to restore the balance of the stresses measured by the gauges, which ensures that the resultant of the forces exerted on the vibrator by the ground is perpendicular to the ground surface.

This may be executed in two different manners: either before the starting of operation of the vibrator by resorting to the permanent stresses which may be considered as continuous components, or else during the operation of the vibrator by resorting to the forces with alternating directions then produced, which are measured by the gauges.

Figure 2:
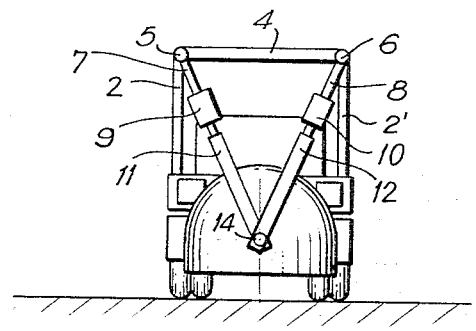
Figure 3:
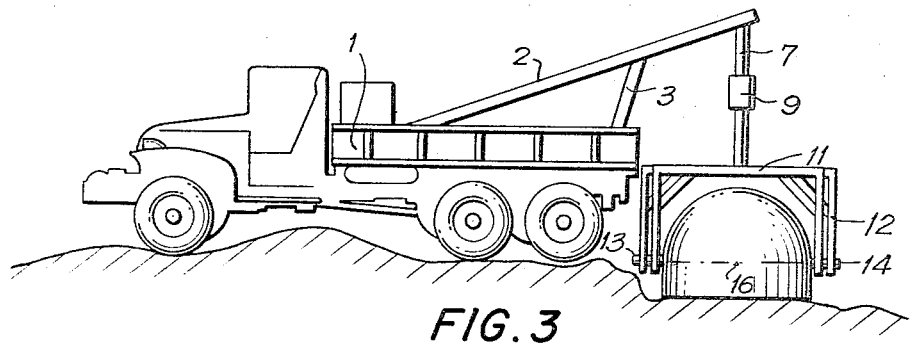
Figure 4:
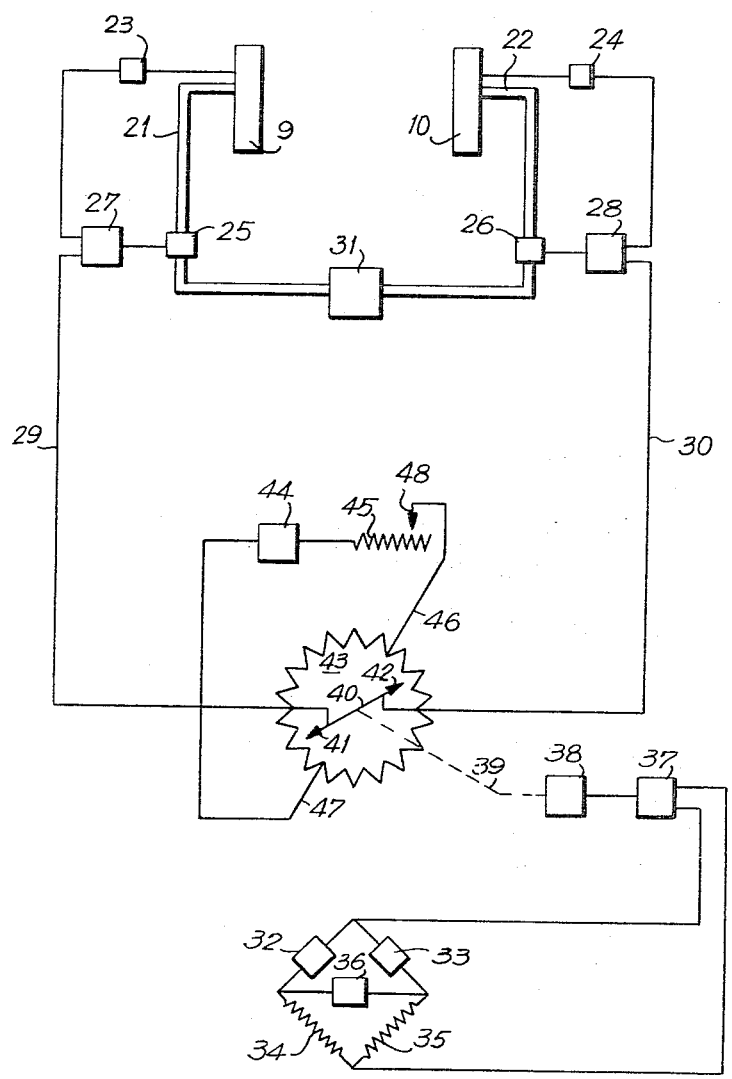
Figure 6:
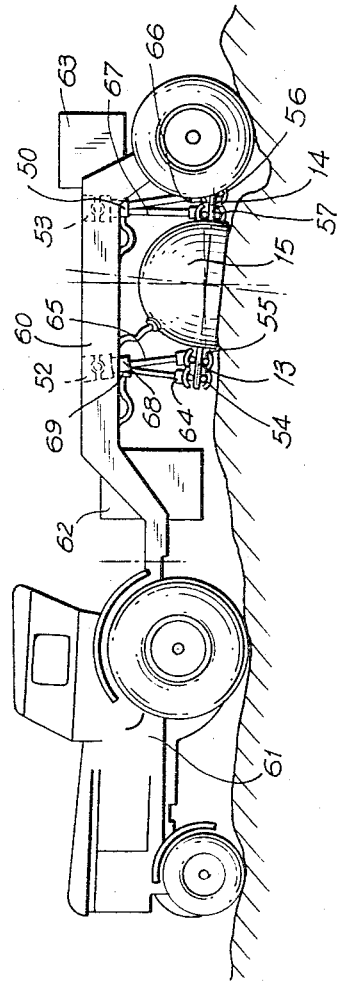
Figure 5:
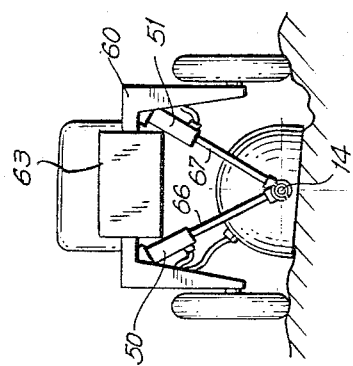

The invention will be disclosed in further detail hereinafter, with reference to the accompanying drawings wherein:

FIG. 1 is a side view of a truck carrying a vibrator;
FIG. 2 is an end view of the truck in its transportation condition, the vibrator being raised above ground;
FIG. 3 is a side view of the truck with the vibrator in contact with the ground surface, that is in an operative position;
FIG. 4 is a wiring diagram of the means controlling the pressures exerted by the jacks; and
FIGS. 5 and 6 are respectively an end view and a side view of a modifed embodiment of the means carrying a vibrator on board a trailer.

In the different figures, the same reference numbers designate the same members. In the drawings, 1 designates a truck to the chassis of which is rigidly secured a framework including beams 2, 2' and 3 connected by a beam 4 forming a transverse stay.

To the connecting points between the beams 2 and 4 and between the beams 2' and 4 are pivotally secured through ball and socket joints 5 and 6 two rods or spindles 7 and 8 which receive corresponding jacks 9 and 10, the pistons of which are connected through the forked members 11 and 12 with bearing members revolvably carried in bearing surfaces 13 and 14, preferably cast integral with the casing of a vibrator 15.

Said bearing surfaces 13 and 14 are located on a casing in a manner such that their common geometrical axis passes through the center of gravity 16 of the vibrator.

The jacks may act in both directions and operate selectively upwardly and downwardly.

When it is desired to convey the vibrator with the vehicle, the jacks are caused to exert an upward thrust which overcomes the weight of the vibrator and their stroke is such that the vibrator is raised above ground and is suspended entirely from the chassis of the truck through the agency of the beams 2 and 3, as illustrated in FIGS. 1 and 2.

When it is desired to start operation of the vibrator, it is sufficient to release the jacks so that the vibrator then sinks to the ground, as illustrated in FIG. 3.

A fraction of the suspended weight of the truck is then transferred to the vibrator casing by making the jacks exert a downward thrust on the latter. The pressures exerted by the two jacks are adjusted through the agency of the wiring diagram illustrated in FIG. 4 which shows how the fluid pressures in the jack are controlled so as to adjust the forces produced by said jacks.

FIG. 4 shows the entire control system including the two jacks 9 and 10; the lines 21 and 22 feed fluid into the upper surfaces of the pistons so as to exert a downwardly directed force on the latter.

The pressures prevailing in the jacks are measured and transformed into electric voltages by the measuring apparatus 23 and 24.

Electrically controlled valves 25 and 26 allow adjusting the values of the fluid pressures in the corresponding jacks, said valves being controlled by the apparatus illustrated at 27 and 28 under the control of the electric voltages fed thereto by the leads 29 and 30.

To this end, the voltages at the output ends of the measuring apparatus 23 and of the lead 29 are applied to the input end of said apparatus 27 which latter adjusts the position of the coresponding valve 25 in a manner such that the input voltages feeding the latter may balance each other.

The same is the case for the apparatus 28 which ensures balance between the voltages at the output ends of the measuring apparatus 24 and of the lead 30.

The fluid is supplied to the jacks 9, 10 via the electrically conrolled valves 25 and 26 from common container 31 containing fluid under pressure.

The parts referred to hereinabove are associated in a conventional manner so that the voltages fed by the leads 29 and 30 may control the pressures exerted by the fluid inside the jacks 9 and 10.

32 and 33 designate two gauges located at the lower end of the vibrator for measuring the stresses at selected points of the vibrator casing.

Wheatstone bridge incorporates the gauges 32 and 33 and two resistances 34 and 35. Said bridge is connected in a conventional manner and is fed by a D.C. supply source 36.

The voltage between the two other apices of the bridge is applied to the input of a means 37 controlling an electric motor 38, to the shaft of which, illustrated in dotted lines at 39, is keyed an insulating arm 40 carrying two rotary contact pieces or sliders 41 and 42 engaging a potentiometer 43 constituted by a toroidal shaped winding forming a continuous resistance.

The sliders 41 and 42 are connected with the leads 29 and 30 respectively.

The potentiometer 43 is fed from a D.C. supply source 44 feeding said potentiometer through an adjustable resistance 45 as provided by two stationary taps 46 and 47 arranged in diametrically opposed relationship on the potentiometer and connected respectively with a terminal of the supply 44 and with the adjustable tap 48 on the resistance 45.

It will be readily apparent that the position given to the adjustable tap 48 defines the voltage applied between the taps 46 and 47, that is the sum of the voltages in the leads 29 and 30, said sum being independent of the angular position of the arm 40. Consequently, said adjustable tap 48 defines the sum of the vertical forces exerted by the jacks 9 and 10 on the vibrator casing.

In contradistinction, the individual values of the stresses produced by the two jacks are defined by the angular position given to the arm 40 which position defines obviously the individual values of the voltages applied to the leads 29 and 30. Consequently, the wiring diagram described produces an automatic balance between the stresses exerted on the gauges 32 and 33 since any difference between such stresses exerted on said gauges produces a voltage across the terminals of the controlling means 37, whereby the motor 38 is started and causes the arm 40 to rotate, which leads to a modification in the voltages in the leads 29 and 30 until a balance is obtained when the stresses exerted by the gauges 32 and 33 are equal, which leads to the desired result.

In the above embodiment, the gauges 32 and 33 measure the D.C. component of the forces exerted by the jacks.

It is also possible to resort to the action of a force component of alternating directions in which case the gauges 32 and 33 are sensitive to such components of alternating directions.

The gauges may be of any suitable type, for instance of an extensiometric type or of a type responding to the modification in the magnetic permeability of an iron core when subjected to stresses. When using gauges of this latter type, the supply 36 is a supply of A.C. the frequency of which has a suitably selected value while the motor-controlling means 37 incorporate in such a case a detector.

The mounting of the vibrator according to FIGS. 1 to 3 requires for its proper operation a flat ground surface at the location where the vibrator rests on said ground, said condition being obviously essential to ensure proper transmission of vibrations to the ground. Furthermore, it is necessary for said flat surface to pass through a line parallel to the common axis of the bearing surfaces 13 and 14. As a matter of fact, if it is otherwise, the vibrator would rest askew on the ground which would lead to the production of unallowable stresses on the bearing surfaces 13 and 14 risking a breakage of the latter.

In order to avoid such drawback, the present invention provides a further manner of connecting the vibrator with the vehicle. In this embodiment, the connection between the vibrator casing and the vehicle chassis is no longer provided by means of two jacks, but by means of four jacks which are associated in pairs, each pair replacing the jack 9 or the jack 10, as the case may be.

The pistons of said jacks are pivotally secured to the rotulas of ball and socket joints, the centers of which also lie on a straight line passing through the center of gravity of the vibrator. The pressures exerted by the fluid on each pair of jacks is the same and consequently it is possible to resort, for the control of pressure, to the wiring diagram according to FIG. 4. It is immediately apparent that the resultant of the stresses exerted by each pair of jacks is the same as that exerted by the corresponding jack 9 or 10 in the preceding embodiment so that the description disclosed hereinabove is equally pertinent hereto.

This last modification is illustrated in FIGS. 5 and 6 in the particular case in which the conveying vehicle is constituted by a half-track.

FIG. 5 is an end view and FIG. 6 is a side view of the half-track 60 associated with the propelling vehicle 61. The half-track is suitably ballasted by heavy masses 62 and 63. 15 designates again the vibrator with its bearing surfaces 13 and 14 each carrying two rotulas forming therewith ball and socket joints. Said rotulas are illustrated at 54 and 55 for the bearing surface 13 and at 56 and 57 for the bearing surface 14. Each of said rotulas carries the lower end of the corresponding piston, 64, 65, 66 and 67 controlled each by one of the four jacks 68, 69, 50 and 51. The cylinders of said jacks are pivotally connected through four ball and socket joints such as 52 and 53 with the chassis of the half-track.

In said modification, it is also necessary for the ground underneath the vibrator to be leveled so as to ensure a proper contact between the vibrator and ground, but the line perpendicular to such a contacting area may slope in any direction with reference to the chassis of the half-track, provided the axes in each pair of jacks remain substantially parallel, so that it is certain that the resultant of the stresses exerted on the casing of the vibrator passes through the center of gravity of said vibrator. This latter condition is easily fulfilled in practice.

The jacks 68 and 50 located on the same side of the trailer form a first pair equivalent to the jack 9 or the jack 10 of the first embodiment. The two other jacks 69 and 51 located on the other side form the second pair corresponding to the other jack.

Obviously, a number of details may be modified in the above-described embodiment, without departing from the scope of the invention as defined in the accompanying claims.

What we claim is:

1. A system for securing to a vehicle chassis the casing of a vibrator adapted to produce elastic waves, comprising a framework rigid with the chassis, means pivotally connecting the vibrator casing with said framework and constraining the forces acting between the chassis and the vibrator to pass through the center of gravity of the vibrator, jacks fitted between said framework and the vibrator and adapted to shift the vibrator casing between a lower ground-engaging position and an upper released position, gauges carried by the vibrator casing and measuring the stresses exerted by the ground on the vibrator casing and means controlled by said gauges and acting on the jacks so that the resultant of the forces exerted on the vibrator including its own weight and the reaction of the ground on the vibrator has a direction perpendicular to the ground surface area in contact with the vibrator.

2. A system for securing to a vehicle chassis the casing of a vibrator adapted to produce elastic waves, comprising a framework rigid with the chassis, means pivotally connecting the vibrator casing with said framework and constraining the forces acting between the chassis and the vibrator casing to pass through the center of gravity of the vibrator, two jacks pivotally secured to the frame, two pairs of bearings located on a common line in a vertical plane symmetrically of the center of gravity of the vibrator, a forked member controlled by each jack and the lower ends of which are revolvably carried in the cooperating bearings of the corresponding pair, the jacks being adapted to shift the vibrator casing between a lower ground-engaging position and an upper released position, gauges carried by the vibrator casing and defining the stresses exerted by the ground on the vibrator casing, and means controlled by said gauges and acting on the jacks so that the resultant of the forces exerted on the vibrator, including its own weight and the reaction of the ground on the vibrator has a direction perpendicular to the ground surface area in contact with the vibrator.

3. A system for securing to a vehicle chassis the casing of a vibrator adapted to produce elastic waves, comprising a framework rigid with the chassis, means pivotally connecting the vibrator casing with said framework and constraining the forces acting between the chassis and the vibrator casing to pass through the center of gravity of the vibrator, two pairs of jacks pivotally secured through one end to the framework, four ball and socket bearings located in pairs to the front and rear of the vibrator respectively and lying symmetrically of the vibrator on a common axis extending through the center of gravity of the vibrator, said bearings revolvably carrying the ends of the corresponding jacks to allow said jacks to shift the vibrator casing between a lower ground-engaging position and an upper released position, gauges carried by the vibrator casing and defining the stresses exerted the ground on the vibrator casing and means controlled by said gauges and acting on the jacks so that the resultant of the forces exerted on the vibrator including its own weight and the reaction of the ground on the vibrator has a direction perpendicular to the ground surface area in contact with the vibrator.

4. A system for securing to a vehicle chassis the casing of a vibrator adapted to produce elastic waves comprising a framework rigid with the chassis, means pivotally connecting the vibrator casing with said framework and constraining the forces acting between the chassis and vibrator casing to pass through the center of gravity of the vibrator, two jacks pivotally secured to the frame, two pair of bearings located on a common line passing through the center of gravity of the vibrator, a forked member controlled by each jack and the lower ends of which are revolvably carried in the cooperating bearings of the corresponding pair, the jacks being adapted to shift the vibrator casing between a lower ground-engaging position and an upper released position, gauges carried by the vibrator casing and measuring the stresses exerted by the ground on the vibrator casing and located on a line coinciding with the axis of the bearings and through the center of gravity of the vibrator, two resistances forming a Wheatstone bridge with the gauges, an annular potentiometer, diametrically opposed rotary sliders for the potentiometer, the angular position of the sliders being controlled by the output of the bridge defining the difference between the gauge measurements and means through which said sliders act on the jacks so that the resultant of the forces exerted on the vibrator including its own weight and the reaction of the ground on the vibrator has a direction perpendicular to the ground surface area in contact with the vibrator.

No references cited.

WILLIAM FELDMAN, *Primary Examiner.*
OTHELL M. SIMPSON, *Examiner.*